United States Patent [19]

Sasaki

[11] Patent Number: 5,023,740
[45] Date of Patent: Jun. 11, 1991

[54] TAPE CASSETTE HAVING TAPE PROTECTING COVERS

[75] Inventor: Shin Sasaki, Miyagi, Japan
[73] Assignee: Tsuchiya Patent Office, Tokyo, Japan
[21] Appl. No.: 719,250
[22] PCT Filed: Aug. 10, 1984
[86] PCT No.: PCT/JP84/00400
  § 371 Date: Apr. 4, 1985
  § 102(e) Date: Apr. 4, 1985
[87] PCT Pub. No.: WO85/00919
  PCT Pub. Date: Feb. 28, 1985

[30] Foreign Application Priority Data

Aug. 12, 1983 [JP] Japan .................. 58-125989

[51] Int. Cl.⁵ .................................... G11B 23/087
[52] U.S. Cl. .................................................. 360/132
[58] Field of Search ................ 360/132; 242/197-200

[56] References Cited

U.S. PATENT DOCUMENTS

| | | | |
|---|---|---|---|
| 4,418,373 | 11/1983 | Fujimori et al. | 360/132 |
| 4,449,677 | 5/1984 | Ohta et al. | 360/132 X |
| 4,897,751 | 1/1990 | Goto | 360/132 |

FOREIGN PATENT DOCUMENTS

| | | | |
|---|---|---|---|
| 0060475 | 4/1983 | Japan | 360/132 |
| 0062877 | 4/1983 | Japan | 360/137 |
| 0128070 | 7/1983 | Japan | 360/132 |

*Primary Examiner*—David J. Severin
*Attorney, Agent, or Firm*—Lewis H. Eslinger

[57] ABSTRACT

A tape cassette for a recording and reproducing apparatus, for example, a video tape recorder, has: a cassette housing which passes a tape housed therein along an opening in the front surface thereof; a front cover pivotally attached to the cassette housing such as to cover the front side of the passed tape; a rear cover pivotally attached to the front cover such as to cover the rear side of the passed tape; a pin to be guided and provided on the rear cover; and a guide groove provided on the cassette housing such as to guide the pin. When the front cover is pivoted in the cover-opening direction, the pin is guided along the guide groove, whereby the rear cover, together with the front cover, is pivoted in the cover-opening direction while the lower end portion of the rear cover is being pivoted with respect to the front cover so as to separate to the rear of the front cover. In the tape cassette, the front surface of the lower end portion of the rear cover has a slanted surface which is slanted backwardly from its lower end towad its upper end, and further, this slanted surface is set such that, in a state wherein the front and rear covers are closed, the slanted surface is located at a position where an upper corner portion of the slanted surface is substantially flush with the lower back surface of the front cover or a position where the upper corner portion is rearward of the lower back surface of the front cover. By thus setting the slanted surface, when the rear cover is closed, the upper corner portion of the front surface of the rear cover is allowed to move such as to greatly separate to the rear of the magnetic tape, thereby making it possible to prevent the magnetic tape from being caught and damaged by the upper corner portion of the rear cover.

2 Claims, 4 Drawing Sheets

TAPE CASSETTE HAVING TAPE PROTECTING COVERS

FIELD OF THE ART

The present invention relates to a tape cassette best suited for a recording and/or reproducing apparatus such as, for example, a video tape recorder, and particularly, to such a tape cassette as comprises a cassette housing which passes a tape housed therein along an opening in the front surface thereof, a front cover pivotally attached to the cassette housing for covering the front side of the passed tape, a rear cover pivotally attached to the front cover for covering the rear side of the passed tape, a pin to be guided and provided on the rear cover, and a guide groove provided on the cassette housing for guiding the guided pin so as to have the lower end portion of the rear cover separated backwardly from the front cover when the front cover is rotated in its opening direction, so that the rear cover is rotated with respect to the front cover in its opening direction.

BACKGROUND OF THE ART

The conventional tape cassette of this sort for a video tape recorder is constituted as shown in FIGS. 1 to 3.

Firstly, as illustrated in FIG. 1, a cassette housing 3 having an upper half 1 and a lower half 2, a front cover 4 and a rear cover 5 are made of synthetic resin. A magnetic tape 8 is wound around a pair of right and left reels 6 and 7 and accommodated in the upper and lower haves 1 and 2. These halves 1 and 2 are fitted in each other and joined by a pair of screws (not shown) to form the cassette housing 3.

Disposed in the fore part of the cassette housing 3 is a front opening 10 which extends in the right to left direction over the total length of the cassette housing 3. A pair of tape guides 11 are provided within the cassette housing 3 near the respective right and left ends of the front opening 10 and formed integrally with this cassette housing 3. The magnetic tape 8 is guided by this pair of tape guides 11 and passed along the front opening 10 as shown in FIG. 2.

The cassette housing 3 has a U-shaped recess formed between the pair of tape guides 11 and inwardly of the front opening 10. This recess 12 is separated from a portion of the cassette housing 3 where the reels 6 and 7 are accommodated by a U-shaped partition wall 13 formed integrally with the cassette housing 3, and opened at its top and bottom sides.

The front cover 4 is almost of U-shape and has integrally a pair of pivots 15 projected inwardly from their respective right and left end portions 4a thereof and aligned with each other. And as shown in FIG. 2, the pair of pivots 15 are respectively inserted in a pair of insertion holes 16 which are formed in the fore parts of the right and left side walls 3a of the cassette housing 3 and the axes of which are aligned with each other, so that the front cover 4 can be swung on the pivots 15 so as to cover the front side of the magnetic tape 8 passed along the front opening 10.

The rear cover 5 has integrally a top cover 17 on its upper edge as shown in FIG. 1 and a pair of pivots 18 which are so located almost at the centers of their right and left ends in the vertical direction thereof as to be aligned with each other. And as shown in FIG. 2, the rear cover 5 is arranged in parallel with the front cover 4 within the recess 12 so as to cover the rear side of the magnetic tape 8 passed along the front opening 10.

The pair of pivots 18 are inserted in respective insertion holes 20 provided in a pair of projecting pieces 19, which are so formed integrally with the front cover 4 and near the right and left end poritons 4a of the front cover 4 as to project from the back of the front cover 4 as shown in FIGS. 1 and 2, so that the rear cover 5 can be rotated on the pivots 18. The top cover 17 is arranged to cover the recess 12 in as illustrated in FIG. 2.

The right and left end portions 13a of the partition wall 13 are opposed to each other as shown in FIGS. 1 and 2. Disposed on the opposed faces of the right and left end portions 13a are a pair of guide grooves 21 which are of gentle S-shapes and opened at their upper ends.

A pair of projecting pieces 22 are projected backwardly from the respective right and left ends of the rear cover 5 below the pivots 18 and a pair of guided pins 23 are so projected outwardly from the respective projecting pieces 22 as to be aligned with each other and fitted loosely in the respective guide grooves 21. Further, the front cover 4 is urged to rotate in direction of arrow a in FIG. 2, i.e. in its closed direction by a torsion spring (not shown), and locked by a lock lever, when closed.

When the above-mentioned tape cassette is not in use, the front cover 4 is closed and locked as indicated in solid lines in FIG. 2, and in this state, the magnetic tape 8 passed along the front opening 10 is enclosed by the front and rear covers 4 and 5, in other words, the tape cassette is in a state of being completely closed.

When the tape cassette is loaded into the video tape recorder, the front cover is unlocked and turned by an angle of about 90° in direction of arrow a', i.e. in its opened direction to open the front opening 10. And when the front cover 4 is so turned on the pivot 15 from its closed position indicated in solid lines to its opened position indicated in phantom lines in FIG. 2, the pivot 18 of the rear cover 5 is also removed to the position indicated in a phantom line in FIG. 2 together with this front cover 4, so that the rear cover 5 is moved to its opened position indicated in phantom lines in FIG. 2 with the front cover 4.

During this movement of the rear cover 5, the guided pins 23 are guided by the respective guide grooves 21 and moved in direction of arrow c, so that the lower end portion 5a of the rear cover 5 is swung on the pivots 18 backwardly away from the front cover 4 in direction of arrow d. On the contrary, when the front cover 4 is rotated in direction of arrow a in FIG. 2 to be closed, the rear cover 5 is moved in the same direction as the front cover 4, with rotation in direction of arrow d' as the guided pin 23 is moved in direction of arrow c' within the guide groove 21, so that the lower end portion 5a of the rear cover 5 returns to the original position as indicated in solid lines in FIG. 2.

However, in such a tape cassette constituted and functioning as mentioned above, there is a fault as described below.

That is, the feature of the tape cassette of this sort is that the magnetic tape 8 passed along the front opening 10 of the cassette housing 3 is completely enclosed by the front and rear covers 4 and 5, when the front cover 4 is closed. Therefore, the lower end portion 5a of the rear cover 5 is at first lowered in direction of arrow e passing near the back side of the magnetic tape 8 as shown in FIG. 3, and then moved around below the magnetic tape 8 in direction of arrow f to be brought to the position indicated in phantom-lines in FIG. 3, where the lower end portion 5a of the rear cover 5 abuts on its front surface 25 against a notched portion 26 provided at the lower back surface 4b of the front cover 4.

In the state above-mentioned, the front surface 25 of the rear cover 5 extends vertically in parallel with the lower back surface 4b of the front cover 4. Therefore, as indicated in solid lines in FIG. 3, among all the portions of rear cover 5 the upper corner portion 27 of the front surface 25 approaches nearest to the magnetic tape 8, as the rear cover 5 is closed, so that the distance $l_1$ between the upper corner portion 27 of the front surface 25 and magnetic tape 8 becomes very small.

Hence, it is necessary to make the above distance $l_1$ large to a certain degree, so as to prevent the magnetic tape 8 from coming in contact with the upper corner portion 27 or from being caught between the covers 4 and 5, while the rear cover is closed. From this reason, it is standardized that the distance $l_1$ of the tape cassette of this sort is to be more than 1 mm.

However, the cassette housing 3, front cover 4 and rear cover 5, etc. are made of synthetic resin, so that their dimentional errors due to molding are not avoidable. Therefore, it is difficult to hold the distance $l_1$ always within a predetermined extent. As a result, it often occurs that the upper corner portion 27 comes in contact with the magentic tape 8, or that the magnetic tape 8 is caught between the covers 4 and 5. Doubtlessly, it becomes a glaring fault for the tape cassette of this sort.

DISCLOSURE OF THE INVENTION

The object of the present invention is to overcome the above fault of the tape cassette and to provide a novel tape cassette, in which it is possible to hold the distance between an upper corner portion of a front surface of a rear cover and a magnetic tape fully large, even when they are approached nearest to each other.

In the tape cassette of this invention, the front surface of the rear cover is so formed as to extend not vertically but aslant under the state that the front and rear covers are closed. That is, this slanted front surface extends backwardly aslant from its lower end toward its upper end and the upper end of the slanted front surface is flush with the lower back surface of the front cover. This upper corner may be located backwardly of the back surface of the front cover.

In case of the tape cassette as mentioned above, the upper corner portion of the front surface of the rear cover can be moved backwardly and largely away from the magentic tape when the rear cover is closed, so that it is possible to make the distance between the upper corner portion and magentic tape fully large. Hence, it is prevented that the upper corner portion of the rear cover comes in touch with the magnetic tape, or that the magnetic tape is caught between the covers.

BRIEF EXPLANATION OF THE DRAWINGS

FIG. 4 is an enlarged fragmentary view illustrating a characteristic portion of the embodiment, and FIGS. 5 and 6 are enlarged fragmentary views similar to FIG. 4 illustrating modified examples.

THE BEST MODE OF CARRING-OUT THE INVENTION

Figure 1:
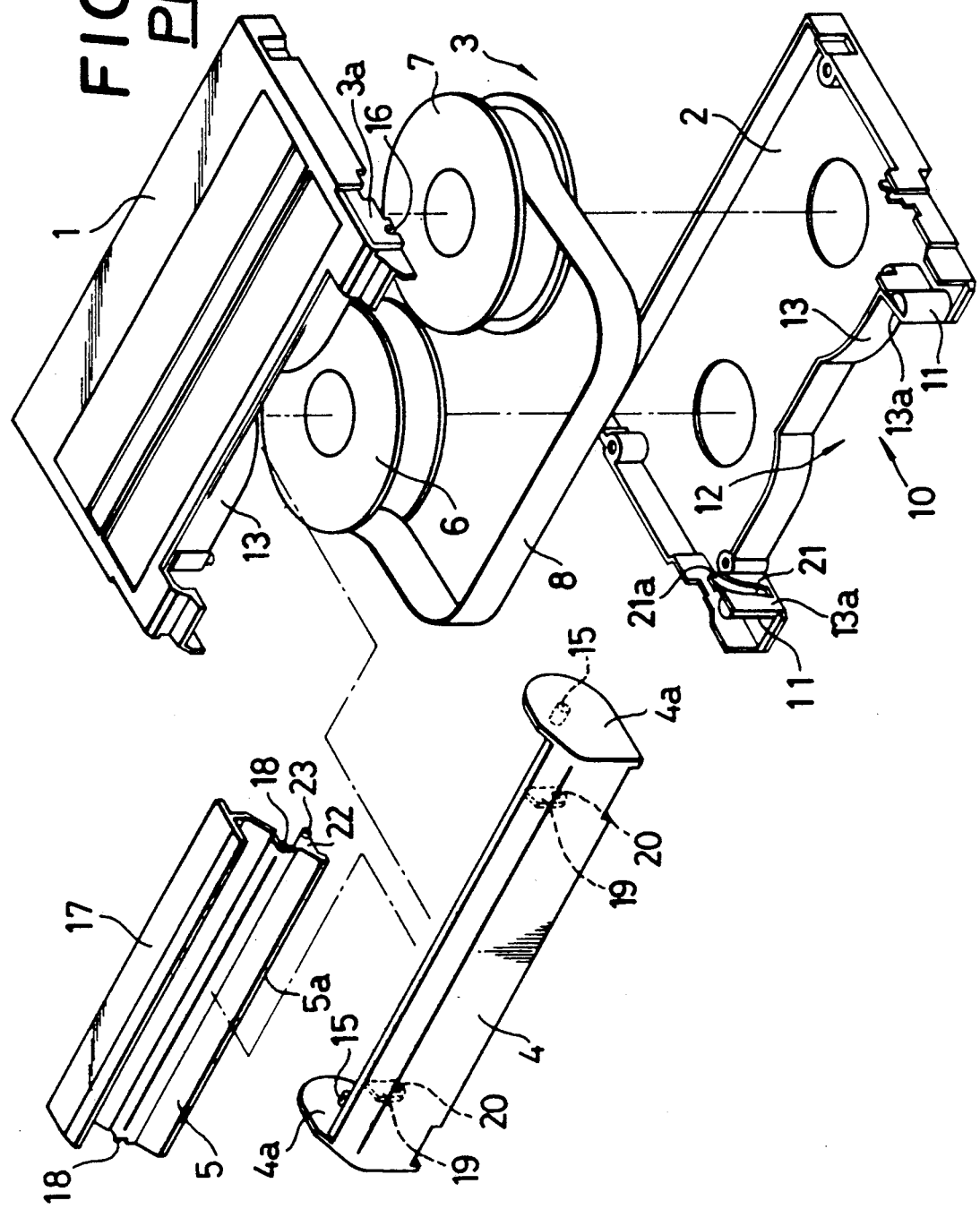
FIG. 1 is an exploded, perspective view of a conventional tape cassette for a video tape recorder.
Figure 2:
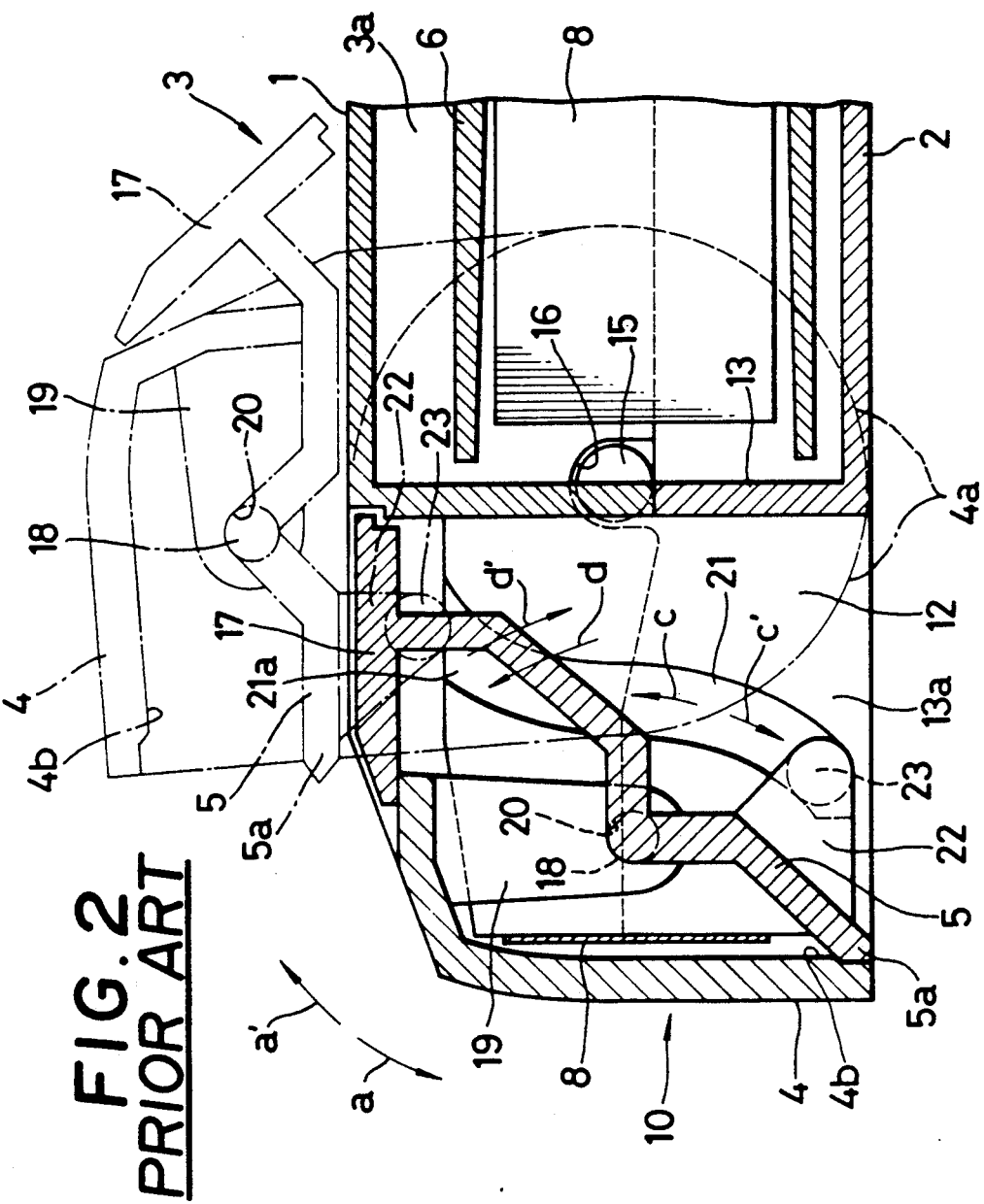
FIG. 2 is an enlarged sectional side view in the assembled state of the tape cassette shown in FIG. 1.
Figure 3:
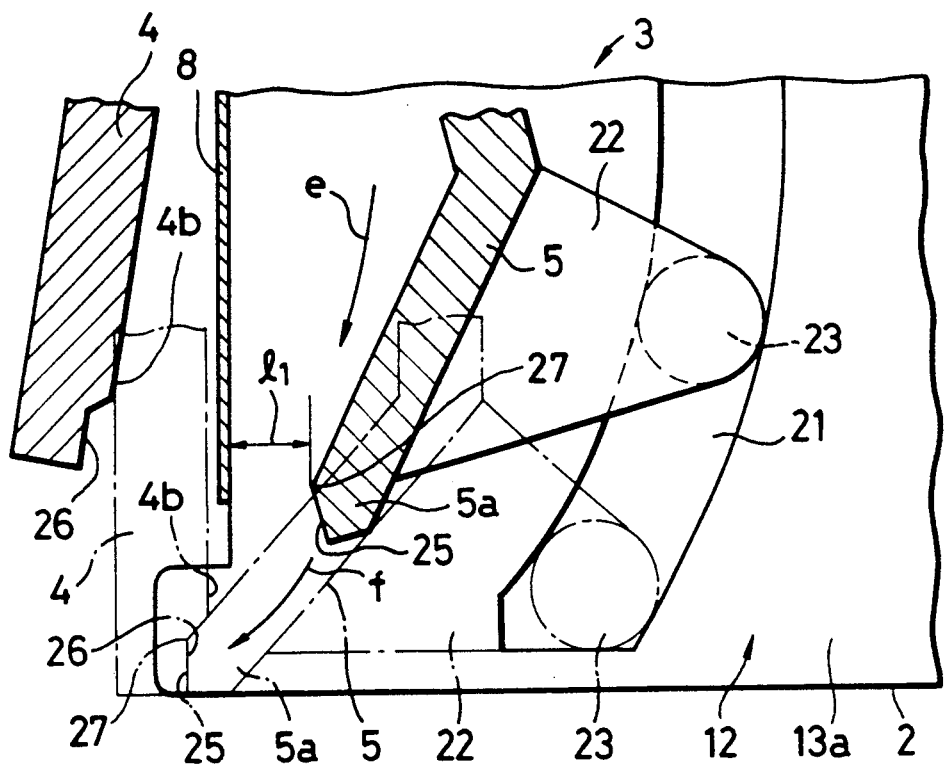
FIG. 3 is an enlarged fragmentary view illustrating a portion of the structure appearing in FIG. 2.
Figure 4:
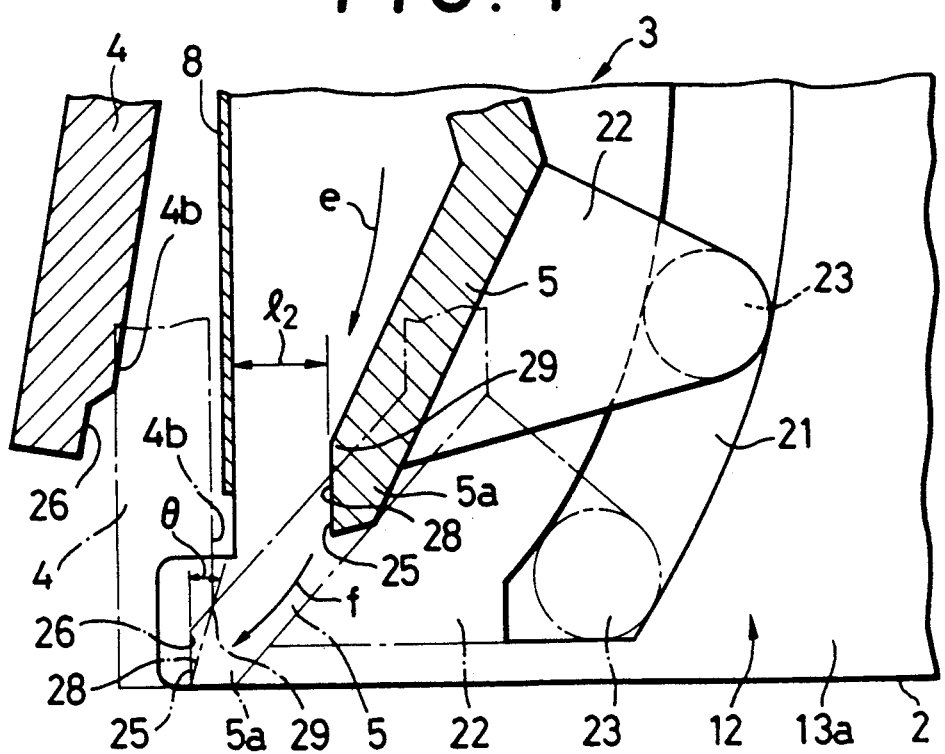
FIGS. 4 to 6 show an embodiment of a tape cassette for a video tape recorder, to which this invention is applied.
Figure 5:
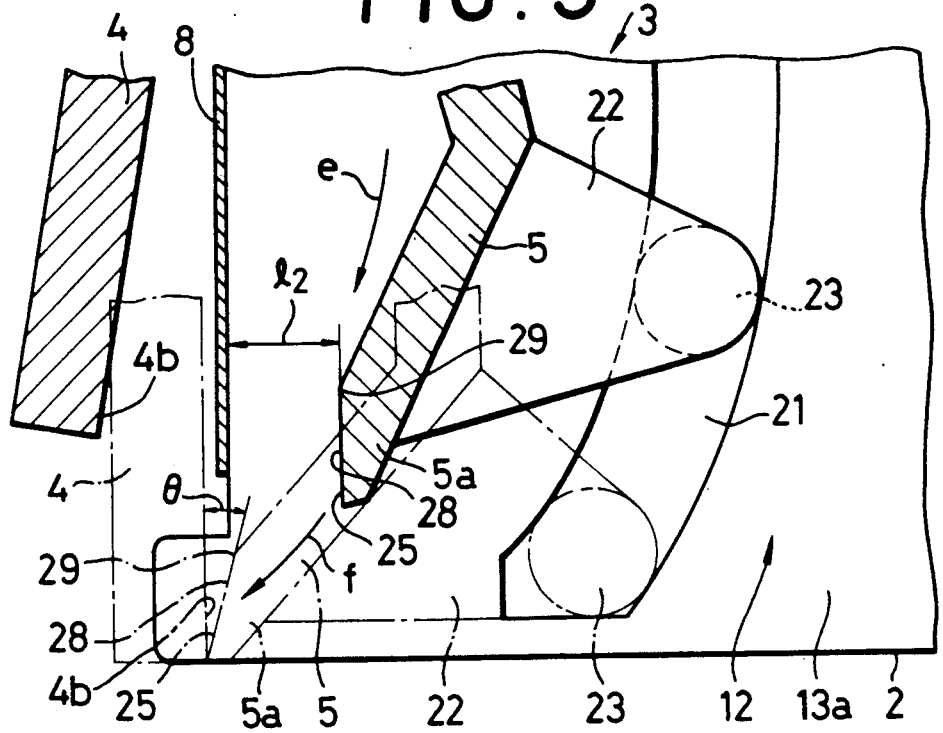
Figure 6:
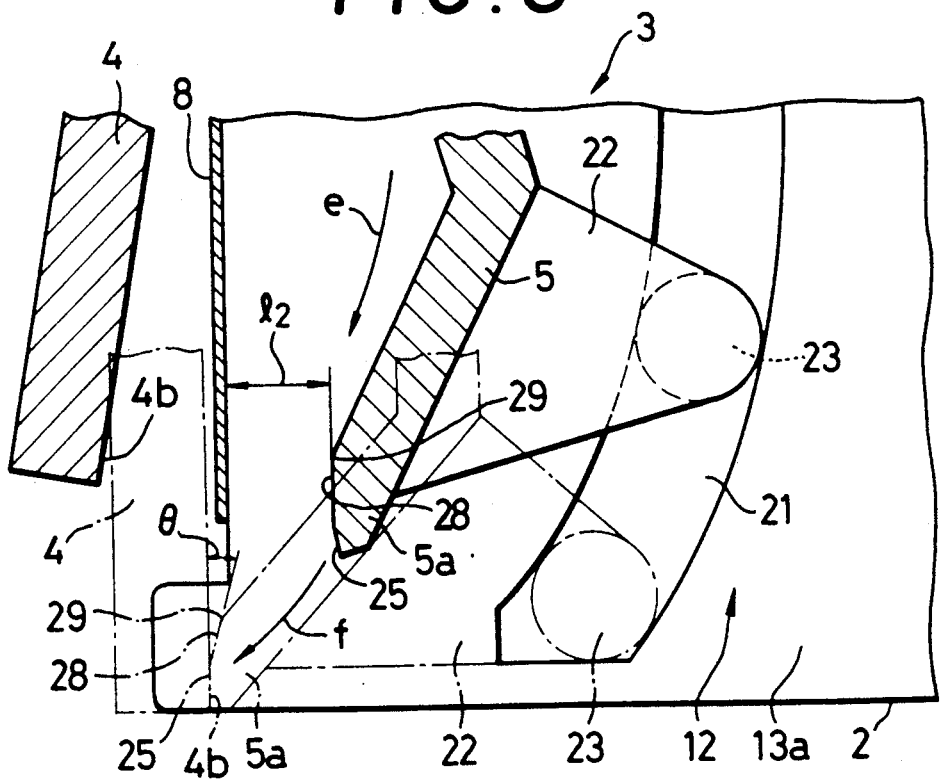

Referring to FIGS. 4 to 6, a tape cassette for a video tape recorder embodying the present invention will be described hereinafter. In the following description, as the tape cassette is partly the same in construction as the conventional one illustrated in FIGS. 1 to 3, the same reference numerals are used and explanations therefore are abbreviated.

As illustrated in FIG. 4, there is formed a slanted surface 28 in a front surface 25 of the lower end portion 5a of a rear cover 5, which extends backwardly aslant at angle $\theta$ from the lower end toward the upper end of the front surface 25. This slanted surface 28 also extends over the total length in the longitudinal direction (the right to left direction) of the front surface 25.

When the rear cover 5 is closed, the lower end of the slanted surface 28 abuts against the lower end of a notched portion 26, which is formed in the lower back surface 4b of the front cover 4, and simultaneously, the upper corner portion 29 of the slanted surface 28 abuts against the upper end of the notched portion 26 as indicated in phantom lines in FIG. 4. The angle $\theta$ formed with the lower back surface 4b of the front cover 4 is within an extent of 10-30°.

According to the tape cassette constructed as mentioned above, the rear cover 5 can be not only closed completely without any difference from the case of the conventional tape cassette but is also spaced apart further from the magentic tape 8 as indicated in solid lines in FIG. 4. In other words, the distance $l_2$ between the magnetic tape 8 and the upper corner portion 27 of the front surface 25 of the rear cover 5 becomes very large due to the slanted surface 28 formed in the front surface 25, even when the upper corner portion 27 is approached nearest to the magnetic tape 8. Hence, it is prevented that the upper corner portion 29 of the slanted surface 28 comes in touch with the magnetic tape 8, or that the magnetic tape 8 is caught between the covers 4 and 5. Further, when the rear cover 5 is closed, the lower end of the slanted surface 28 abuts against the lower end of the notched portion 26 formed in the lower back surface 4b of the front cover 4 as indicated in phantom lines in FIG. 4, so that the dustproof effect of the covers 4 and 5 is never lost at all.

The invention is not limited to such a precise embodiment. For example, the slanted surface 28 can be modified as illustrated in FIGS. 5 and 6.

In case of a tape cassette shown in FIG. 5, there is no notched portion in the lower back surface 4b of the front cover 4. When the rear cover 5 is closed, the lower end of the front surface 25 abuts against the lower back surface 4b of the front cover 4 and the slanted surface 28 in the front surface 25 traverses backwardly and gradually away from the front cover 4 in its upper direction. On the way to the rear cover's opened position, the distance $l_2$ becomes larger as compared with the case of the embodiment due to the absence of the notched portion.

In case of the tape cassette shown in FIG. 6, it will be seen that the lower part of the front surface 25 that becomes vertical when the rear cover 5 is closed, is left as it is and the slanted surface 28 extends from the upper end of this lower part 25. The lower part of the front surface 25 comes in areal contact with the back surface of the front cover 4, so that the dustproof effect is much improved. The distance l₂ can be also held larger.

This invention can be applied to the tape cassette not only for the video tape recorder but also for various kinds of recording and reproducing aparatus or information processing apparatus.

As mentioned above, the feature of this invention is that the distance between the magnetic tape and the upper corner portion of the front surface of the rear cover can be made much larger than that of the conventional tape cassette when the upper corner portion of the front surface is approached nearest to the magnetic tape on the way to the rear cover's opened or closed position. Accordingly, when the rear cover is opened or closed, it can be prevented that the upper corner portion of the front surface of the rear cover comes in contact with the magnetic tape, or that the magnetic tape is caught between the front and rear covers, and further, the dustproof effect of the tape cassette is never lost at all.

I claim:

1. A tape cassette comprising:
   a cassette housing which passes a tape housed therein along an opening in a front surface of said housing;
   a front cover having a rectangular cross section and having a flat bottom surface and flat front and rear surfaces and being pivotally attached to the cassette housing for covering the front side of the passes tape;
   a rear cover pivotally attached to the front cover for covering the rear side of the passed tape;
   a guide pin provided on the rear cover; and
   a guide groove provided on the cassette housing for guiding the guide pin so as to have a lower edge portion of the rear cover separated from the front cover rearwardly relative to said front surface when the front cover is pivotally rotated in its opening direction, so that the rear cover is pivotally rotated therewith with respect to the front cover in its opening direction,
   characterized in that a front surface of said lower edge portion of the rear cover is formed of a first flat surface and a second flat surface angularly arranged relative thereto, said second flat surface being slanted and extending rearwardly at an angle θ between 10° to 30° from a transition line between said first and second flat surfaces toward an upper end of said front surface and an entire area of said first flat surface contacts said flat rear surface of said front conver and said second flat surface is completely out of contact with said flat rear surface of said front cover and extends rearwardly at said angle θ under the tape during the closed state of said front and rear covers.

2. A tape cassette, comprising:
   a cassette housing having a tape arranged therein for passing along an opening in a front surface of said housing;
   a front cover pivotally attached to said housing for covering a front side of said tape in said opening and having a longitudinal groove formed along the inside of a lower edge thereof, said groove being bounded by an uppermost edge and lowermost edge;
   a rear cover pivotally attached to said front cover for covering a rear side of said tape in said opening;
   a guide pin formed in said rear cover;
   a guide groove formed in said cassette housing for guiding said guide pin so as to have a lower edge of said rear cover separated from said front cover rearwardly, relative to said front surface, as said front cover is pivotally rotated in an opening direction, said rear cover cooperating with said front cover for pivotal rotation therewith;
   characterized in that said lower edge of said rear cover is formed having a flat planar front surface and a flat bottom surface, said front surface being slanted rearwardly relative to said front surface of said housing at an angle θ from said bottom surface, said angle θ being between 10° to 30°, said slanted front surface extending rearwardly for a length so as to contact only said lowermost edge and said uppermost edge of said groove formed in said rear cover at said angle θ and extending beneath the tape when said front and rear covers are in a closed state.

* * * * *

UNITED STATES PATENT AND TRADEMARK OFFICE
CERTIFICATE OF CORRECTION

PATENT NO. : 5,023,740
DATED : June 11, 1991
INVENTOR(S) : Shin Sasaki It is certified that error appears in the above-identified patent and that said Letters Patent is hereby corrected as shown below:

On the title page:

In [73] Assignee: "Tsuchiya Patent Office" should be replaced with --Sony Corporation--

Signed and Sealed this

Second Day of March, 1993

Attest:

STEPHEN G. KUNIN

*Attesting Officer*    *Acting Commissioner of Patents and Trademarks*